US011935149B2

United States Patent
Kim et al.

(10) Patent No.: US 11,935,149 B2
(45) Date of Patent: Mar. 19, 2024

(54) ELECTRONIC DEVICE AND IMAGE RENDERING METHOD THEREOF FOR ADJUSTING FRAME RATE

(71) Applicant: Samsung Electronics Co., Ltd., Gyeonggi-do (KR)

(72) Inventors: Dohyun Kim, Gyeonggi-do (KR); Igor Nazarov, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 213 days.

(21) Appl. No.: 17/544,411

(22) Filed: Dec. 7, 2021

(65) Prior Publication Data
US 2022/0156877 A1    May 19, 2022

Related U.S. Application Data

(63) Continuation of application No. PCT/KR2021/016648, filed on Nov. 15, 2021.

(30) Foreign Application Priority Data

Nov. 13, 2020   (KR) .......................... 10-2020-0152270
Apr. 22, 2021   (KR) .......................... 10-2021-0052642

(51) Int. Cl.
  *G06T 1/20*    (2006.01)
  *H04N 7/01*    (2006.01)
(52) U.S. Cl.
  CPC ............. *G06T 1/20* (2013.01); *H04N 7/0127* (2013.01); *G06T 2200/28* (2013.01); *G09G 2340/0435* (2013.01)
(58) Field of Classification Search
  None
  See application file for complete search history.

(56) References Cited

U.S. PATENT DOCUMENTS 6,046,709 A  *  4/2000  Shelton ................... G09G 5/12
                                                  345/1.1
9,679,345 B2   6/2017  Campbell et al.
(Continued)

FOREIGN PATENT DOCUMENTS

CN      109887065       6/2019
KR    1020120123722    11/2012
(Continued)

OTHER PUBLICATIONS

International Search Report dated Feb. 17, 2022 issued in counterpart application No. PCT/KR2021/016648, 10 pages.

*Primary Examiner* — Jason A Pringle-Parker
(74) *Attorney, Agent, or Firm* — The Farrell Law Firm, P.C.

(57) ABSTRACT

An electronic device is provided. The electronic devices includes a display, a memory, and a processor configured to be operatively connected to the display and the memory. The processor is configured to generate a main thread related to a user input and data processing on an application in response to execution of the application and a render thread related to rendering image data in units of frames based on data processed in the main thread, configure a target frame rate for displaying an execution screen of the application on the display, calculate an expected processing time of a current frame based on a processing time of at least one previous frame output through the display, determine a time margin based on the target frame rate and the calculated expected processing time, and perform the user input and data processing after the main thread waits in a sleep state for the time margin.

20 Claims, 12 Drawing Sheets

(56) References Cited

U.S. PATENT DOCUMENTS

| | | | |
|---|---|---|---|
| 10,748,234 B2 | 8/2020 | Apodaca | |
| 11,017,592 B2 | 5/2021 | Babu JD | |
| 2003/0076328 A1* | 4/2003 | Beda | G06T 15/005 |
| | | | 345/503 |
| 2011/0218944 A1 | 9/2011 | Stephens | |
| 2014/0063034 A1* | 3/2014 | Abarca | G09G 5/399 |
| | | | 345/545 |
| 2015/0193958 A1 | 7/2015 | Brunner et al. | |
| 2015/0378787 A1* | 12/2015 | Cameron | G06T 1/20 |
| | | | 718/104 |
| 2016/0162171 A1* | 6/2016 | Yi | G06F 40/143 |
| | | | 715/211 |
| 2018/0286116 A1* | 10/2018 | Babu J D | G06T 15/005 |
| 2021/0065657 A1 | 3/2021 | Zhang et al. | |

FOREIGN PATENT DOCUMENTS

| | | |
|---|---|---|
| KR | 1020160066228 | 6/2016 |
| KR | 10-1680545 | 11/2016 |
| KR | 1020190134694 | 12/2019 |
| KR | 10-2455820 | 10/2022 |

\* cited by examiner

ELECTRONIC DEVICE AND IMAGE RENDERING METHOD THEREOF FOR ADJUSTING FRAME RATE

CROSS-REFERENCE TO RELATED APPLICATION(S)

This application is a bypass continuation application of International Application No. PCT/KR2021/016648, which was filed on Nov. 15, 2021, and is based on and claims priority under 35 U.S.C. § 119 to Korean Patent Application No. 10-2020-0152270, which was filed on Nov. 13, 2020, in the Korean Intellectual Property Office, and Korean Patent Application No. 10-2021-0052642, which was filed on Apr. 22, 2021, in the Korean Intellectual Property Office, the disclosures of which are incorporated by reference herein in their entireties.

BACKGROUND

1. Field

The disclosure relates generally to an electronic device and, more specifically, to an electronic device and method thereof capable of adjusting a frame rate during image content rendering.

2. Description of Related Art

In line with the development of mobile communication and hardware/software technologies, portable electronic devices such as smartphones (hereinafter, referred to as electronic devices) have continuously evolved to be able to incorporate various functions. Electronic devices may provide users with various user experiences by installing and executing different applications. In the case of an application such as a game, image contents may be generated in real time and provided on the display.

An electronic device may use various types of application programming interfaces (APIs) so as to render the image contents generated in the application and to display the same on the display. The electronic device may schedule the output timing of respective frames of the image contents, in order to output the image contents on the display according to a given frame rate.

When an electronic device renders image contents provided by an application, the graphic API may provide the application with a vertical synchronization signal provided by a display sub system, and the application may perform frame pacing based on the same. In this case, the application may adjust the output timing of the image frame according to the target frame rate, but it may be difficult to exactly time the output of the corresponding image frame on the display.

Some graphic APIs available to electronic devices may provide a function for configuring the timing based on when the currently rendered image frame is to be output on the display. However, even if such an API is used, information regarding frames already output in the past is provided, and it is impossible to obtain information regarding the currently rendered frame, thereby making it difficult to schedule the exact output timing of an image frame to be rendered later.

SUMMARY

The present disclosure has been made to address the above-mentioned problems and disadvantages, and to provide at least the advantages described below.

In accordance with an aspect of the disclosure, an electronic device includes a display, a memory, and a processor configured to be operatively connected to the display and the memory. The processor is configured to generate a main thread related to a user input and data processing on an application in response to execution of the application and a render thread related to rendering image data in units of frames based on data processed in the main thread, configure a target frame rate for displaying an execution screen of the application on the display, calculate an expected processing time of a current frame based on a processing time of at least one previous frame output through the display, determine a time margin based on the target frame rate and the calculated expected processing time, and perform the user input and data processing after the main thread waits in a sleep state for the time margin.

In accordance with another aspect of the disclosure, an image rendering method of an electronic device includes generating a main thread related to a user input and data processing on an application in response to execution of the application and a render thread related to rendering image data in units of frames based on data processed in the main thread, configuring a target frame rate for displaying an execution screen of the application on a display, calculating an expected processing time of a current frame based on a processing time of at least one previous frame output through the display, determining a time margin based on the target frame rate and the calculated expected processing time, and performing the user input and data processing after the main thread waits in a sleep state for the time margin.

Various embodiments of the disclosure may provide an electronic device, and method thereof, capable of outputting image contents based on a stable and uniform frame interval according to a target frame rate during image content rendering.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
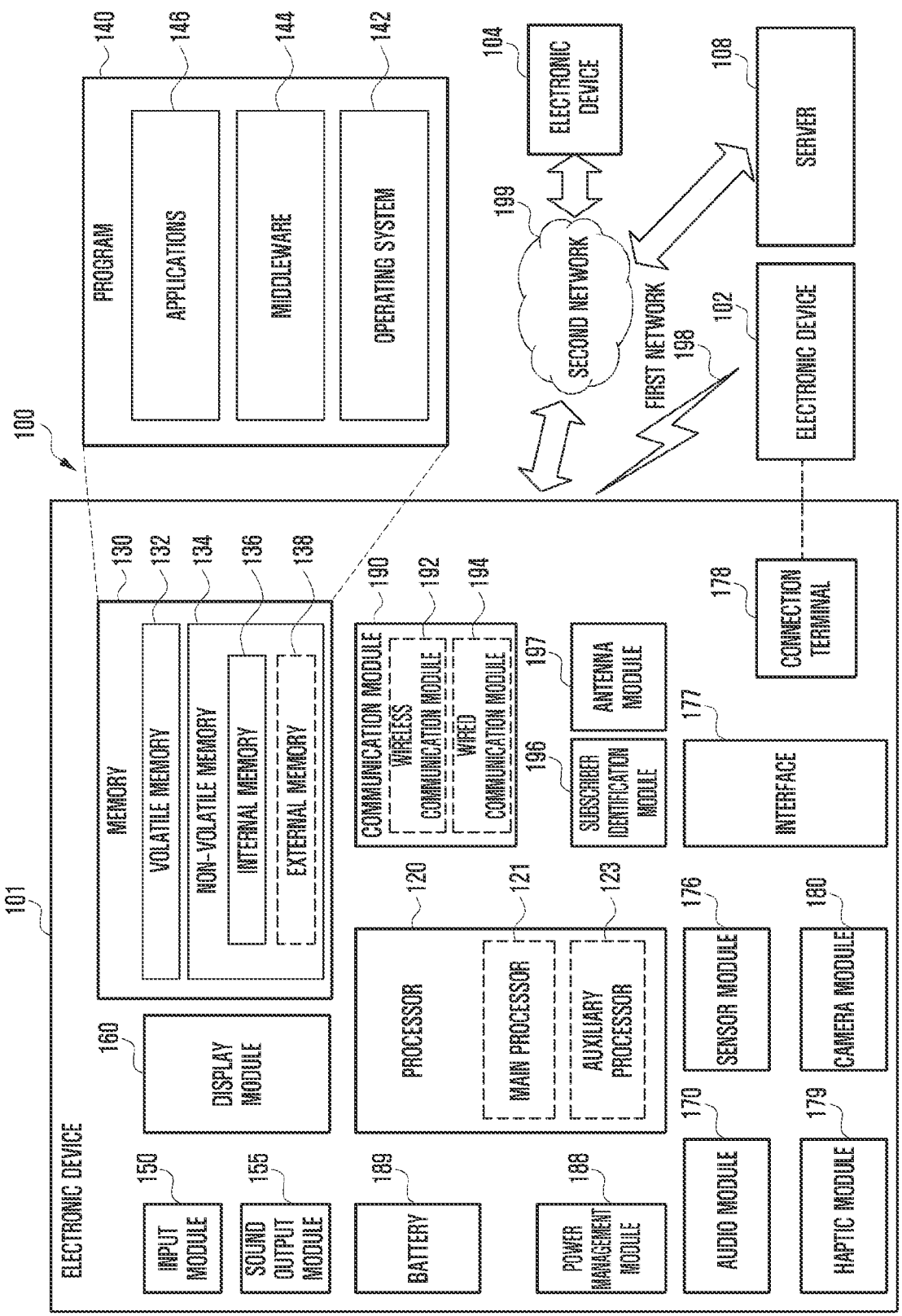
FIG. 1 is a block diagram illustrating an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a GPU, a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
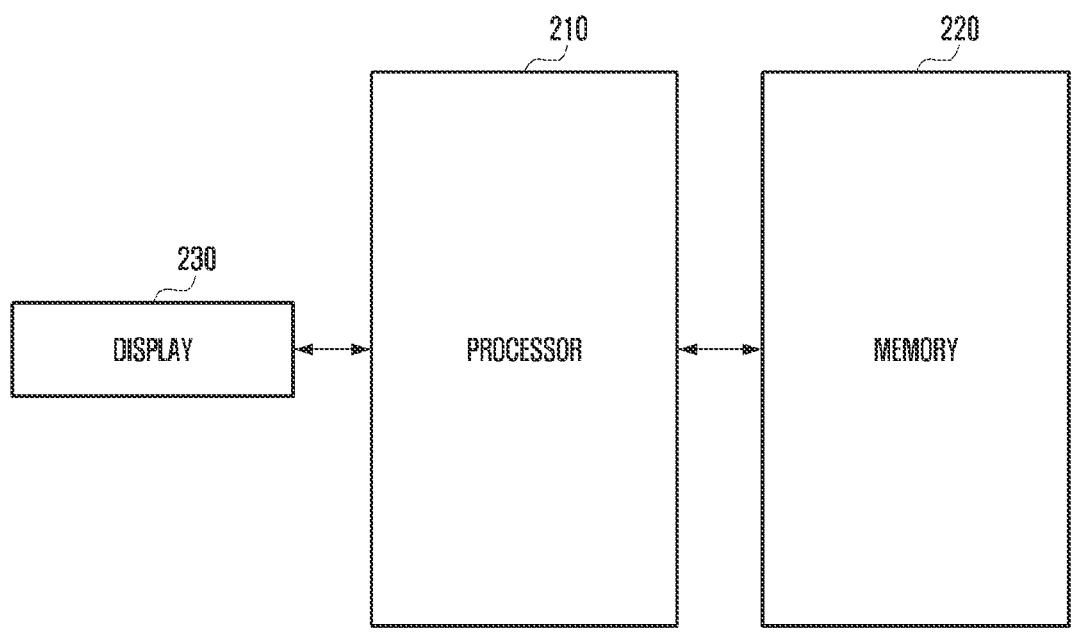
FIG. 2 is a block diagram illustrating an electronic device, according to an embodiment.

FIG. 2 is a block diagram illustrating an electronic device, according to an embodiment.

Referring to FIG. 2, an electronic device 200 includes a display 230, a memory 220, and a processor 210. Other components may be additionally added, or may replace existing components. The electronic device 200 may further include some of the components and/or functions of the electronic devices 200 and 101 of FIG. 1. At least some of the illustrated (or not illustrated) respective components of the electronic device 200 may be operatively, functionally, and/or electrically connected.

The display 230 may be implemented by any one of a liquid crystal display (LCD), a light-emitting diode (LED) display, and an organic light-emitting diode (OLED) display, and is not limited thereto. The display 230 may include a touch screen that detects a touch and/or proximity touch (or hovering) input using a portion of the user's body (e.g., a finger) or an input device (e.g., a stylus pen). At least a portion of the display 230 may be flexible, and may be implemented as a foldable display or a rollable display. The display 230 may include at least some of the components and/or functions of the display module 160 of FIG. 1.

The memory 220 may include a volatile memory and a non-volatile memory and may temporarily or permanently store various types of data. The memory 220 may include at least some of the components and/or functions of the memory 130 of FIG. 1, and may store the program 140 of FIG. 1.

The memory 220 may store various instructions that may be executed by the processor 210. Such instructions may include control commands such as arithmetic and logical operations, data movement, and input/output that can be recognized by the processor 210.

According to various embodiments, the processor 210 is a component capable of performing an operation or data processing related to control and/or communication of each component of the electronic device 200, and may be composed of one or more processors 210. The processor 210 may include at least some of the components and/or functions of the processor 120 of FIG. 1.

According to various embodiments, there will be no limitations on the arithmetic and data processing functions that the processor 210 can implement on the electronic device 200, but hereinafter, various embodiments related to a frame pacing operation for the electronic device 200 to allow each frame constituting an execution screen of an application to be displayed at a uniform cycle according to a target frame rate (or a target frame per second (fps)) will be described. Hereinafter, content related to graphic processing by the electronic device 200 during the operation of a game application will be described, but various embodiments may be applied to various applications other than the game application.

The processor 210 may include a CPU and a GPU. A CPU may perform various arithmetic processing operations defined in an application when the application is executed, and may perform processing corresponding to a user input on the display 230. A GPU may perform a rendering operation of image data processed on the display 230. The processor 210 may be designed as a single system on chip (SoC) including a CPU and a GPU, and at least some of the operations of the processor 210 to be described below are respectively performed by the CPU or the GPU, or divided and performed in the CPU and the GPU.

A main thread and a render thread corresponding to the execution of an application may be generated. The main thread and the render thread may be executed on a game engine or a framework. The main thread may include various arithmetic processing operations related to the operation of the game application, and the render thread may include an operation of rendering image data based on data processed in the main thread. Hereinafter, the main thread may be referred to as a game thread.

The processor 210 may generate image data generated by an application in units of frames. The processor 210 may acquire a frame, may perform a drawing, and then may transmit a presenting command. For example, the processor 210 may configure a front buffer and a back buffer through a multiple buffering method, may swap the front buffer and the back buffer after drawing an image in the back buffer, may output the image drawn in the swapped front buffer on the display 230, and may repeat a process of drawing a new image frame in the back buffer again. Here, the presenting command is a process of exchanging the pointers of the back buffer and the front buffer, and according to the presenting command, the GPU may render an image frame stored in the swapped front buffer.

The GPU may render a received frame data according to the presenting command and may transmit the rendered frame data to a surface flinger, and the surface flinger may compose data in the swapped front buffer and may output the composed data through the display 230.

The display 230 may refresh the frame according to a predetermined refresh rate. When the display 230 operates at 60 fps, the corresponding frame may be refreshed according to a vertical synchronization signal V-sync every interval of about 16.6 milliseconds (ms), and a refresh rate may be variable.

The processor 210 may configure a target frame rate when an image is output on the display 230. For example, the target frame rate (or target fps) may be determined according to an executed application, and may be changed according to an operation mode configured by a user. When the target frame rate is configured, the electronic device 200 may need to display each frame of image data on the display 230 at equal intervals according to the target frame rate. Hereinafter, three embodiments related to a frame pacing operation for uniformly adjusting an output interval of a frame according to a target frame rate will be described. These embodiments are not mutually exclusive, and the electronic device 200 may use all of the first to third embodiments or only some of the first to third embodiments according to circumstances.

According to the first embodiment, when the processor 210 (e.g., the CPU) receives presenting information for a specific frame from a game engine or a framework, the processor 210 may transmit, to a GPU, a presenting command corresponding to the presenting information received after a rendering operation for a previous frame of the specific frame is completed. The processor 210 may process the rendered frame after a predetermined delay time after the rendering operation of the GPU is completed.

The processor 210 may use a timing extension function of a graphics API. The graphics API may be a Vulkan® API, and the timing extension function may be a Google™ display timing extension function of the Vulkan® API. The timing extension function may be a function of obtaining output timing information of the display 230 for rendering results of previous frames and configuring when an image to be presented later is output to the display 230. In a case in which the processor 210 uses the timing extension function, when rendering of the frame is completed in the GPU, the surface flinger may synthesize the rendered frame after a predetermined delay time, and then the corresponding frame may be output through the display 230 at a vertical synchronization timing. However, even when the timing extension function is used as described above, it may be difficult to schedule an accurate output timing of an image to be rendered in the future because the delay time is determined according to the processing time of the previous frames. Accordingly, some frames may be output during a shorter or longer interval than other frames.

In the first embodiment, in order to solve this problem, the processor 210 does not perform presenting immediately even when the presenting command is received from the game engine or the framework, and may perform presenting after waiting until a GPU rendering operation of the previous frame is completed.

The first embodiment will be described in more detail with reference to FIGS. 4 to 6.

According to the second embodiment, the processor 210 may perform an operation related to presenting of a frame through a swap chain thread. The swap chain thread may be a thread that swaps the front buffer and back buffer according to the presenting command. The swap chain thread can be performed independently and in parallel with the main thread.

When the main thread of the game engine or framework executes the presenting command, the processor 210 may wait for the presenting of the next frame until the GPU rendering on the previous frame is completed. In this case, a specific frame may be displayed for a long interval that does not fit the target fps.

In this embodiment, as presenting is performed through the swap chain thread, interference synchronization between the main thread of the game engine or framework and the GPU may be minimized when presenting is performed, so that the display 230 can output each frame according to the target fps.

The second embodiment will be described in more detail with reference to FIGS. 7 to 9.

According to the third embodiment, the processor 210 may calculate an expected processing time of a current frame based on the processing time of at least one previous frame output through the display 230, may determine a time margin (or SyncFrameEnd (SFE)) based on the target frame rate and the calculated processing time, and may perform processing of user input and data after the main thread waits in a sleep state during the time margin. The processor 210 may calculate the expected processing time based on a difference between the presenting times of the at least one previous frame.

While an image frame is being processed in a render thread, user input processing and execution of game logic may be completed in the main thread. In this case, the main thread may wait until the render thread completes the processing of the corresponding frame. In this case, since the operation on the previous frame of the GPU may not be completed at the time of execution of the render thread, the rendering procedure of the image may be delayed.

In this embodiment, even when the user input is detected, the main thread may wait for a SFE interval without immediately processing the user input. The main thread may then process the user input and the game logic after the SFE has elapsed, thereby securing additional time for the render thread to process the previous frame, and shortening the execution time of an ACQUIRE command.

The third embodiment will be described in more detail with reference to FIGS. 10 and 11.

Figure 3:
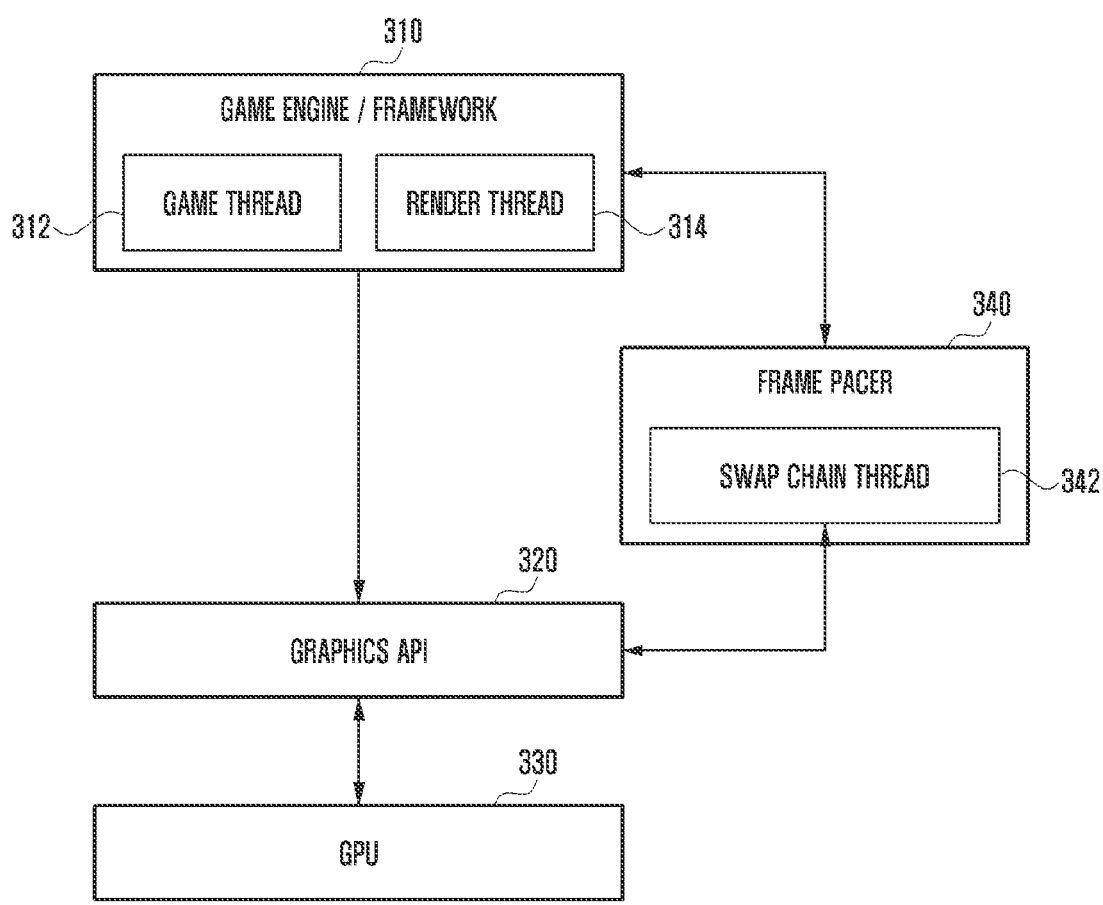
FIG. 3 is a block diagram illustrating a configuration used for image rendering, according to an embodiment.

FIG. 3 is a block diagram illustrating a configuration used for image rendering, according to an embodiment.

A game engine 310 (or a framework) may use a graphics API 320 (e.g., a Vulkan® API) to perform an operation of drawing an image frame according to a target frame rate.

A frame pacer 340 may perform an operation between the game engine 310 and the graphics API 320, and may perform various operations so that a frame of a game application can be output in accordance with the target frame rate.

Figure 4:
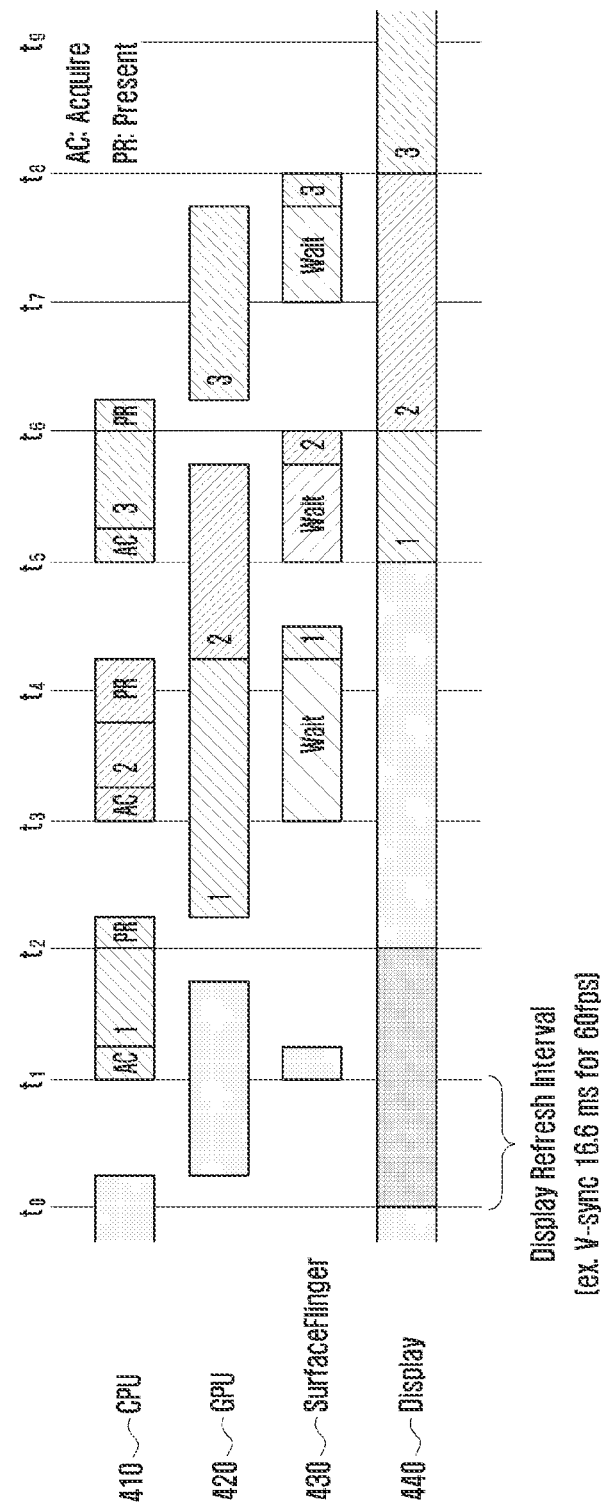
FIG. 4 illustrates a process of processing each frame when a timing extension function of a graphics API is not used, according to an embodiment.
Figure 5:
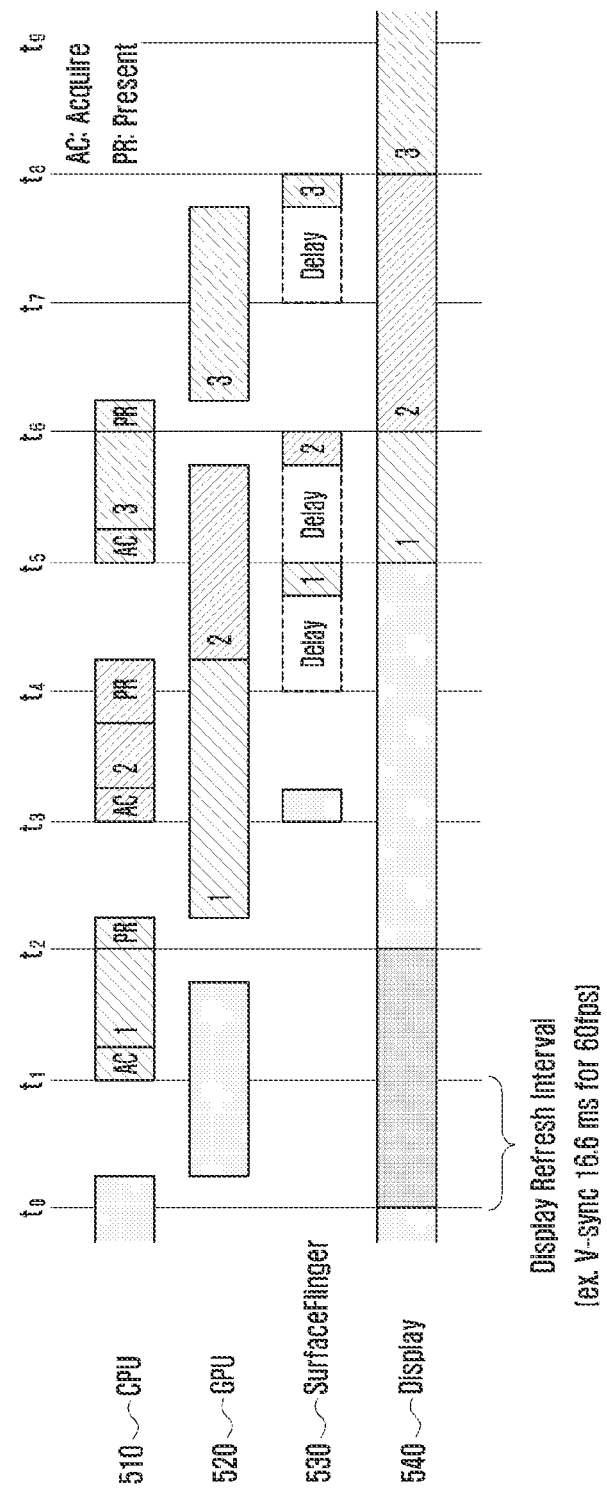
FIG. 5 illustrates a process of processing each frame when a timing extension function of a graphics API is used, according to an embodiment.
Figure 6:
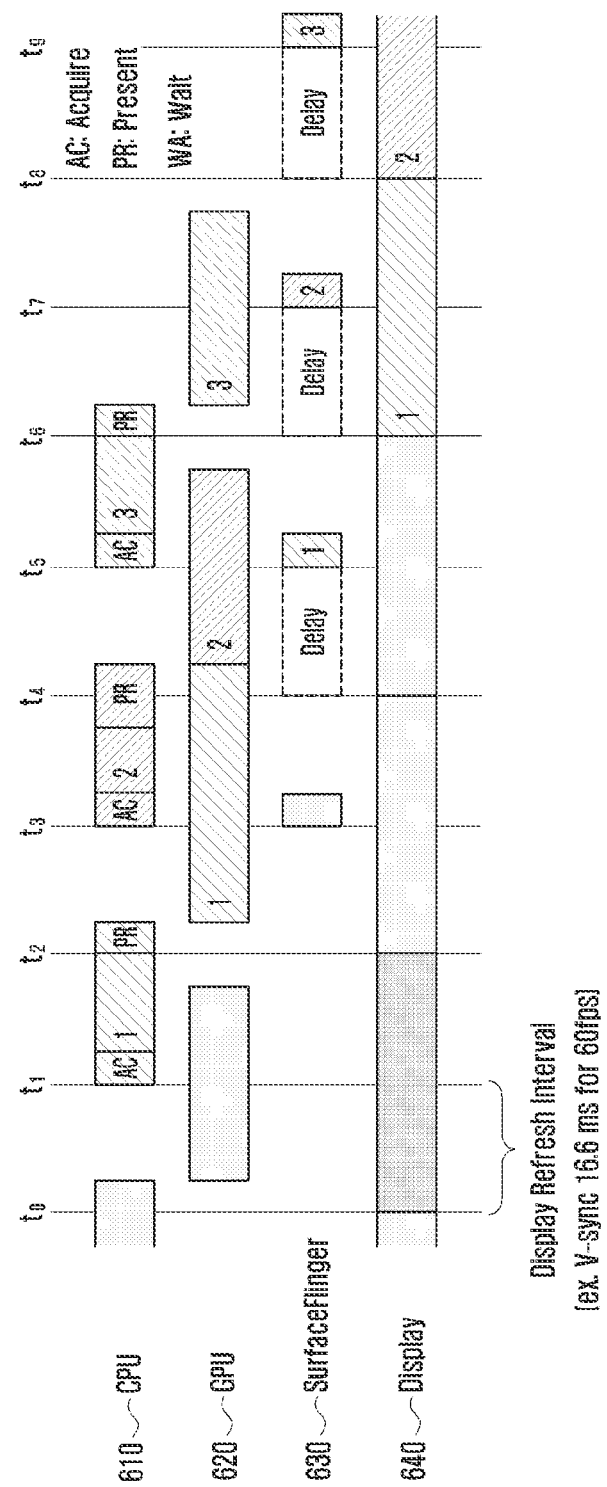
FIG. 6 illustrates a process of processing each frame when a timing extension function of a graphics API is used and a presenting timing is adjusted, according to an embodiment.

According to an embodiment, with reference to FIGS. 4 to 6, when receiving presenting information on a specific frame from the game engine 310 or the framework, the frame pacer 340 may transmit, to a GPU 330, a presenting command corresponding to presenting information received after a rendering operation on the previous frame of the specific frame is completed.

Figure 7:
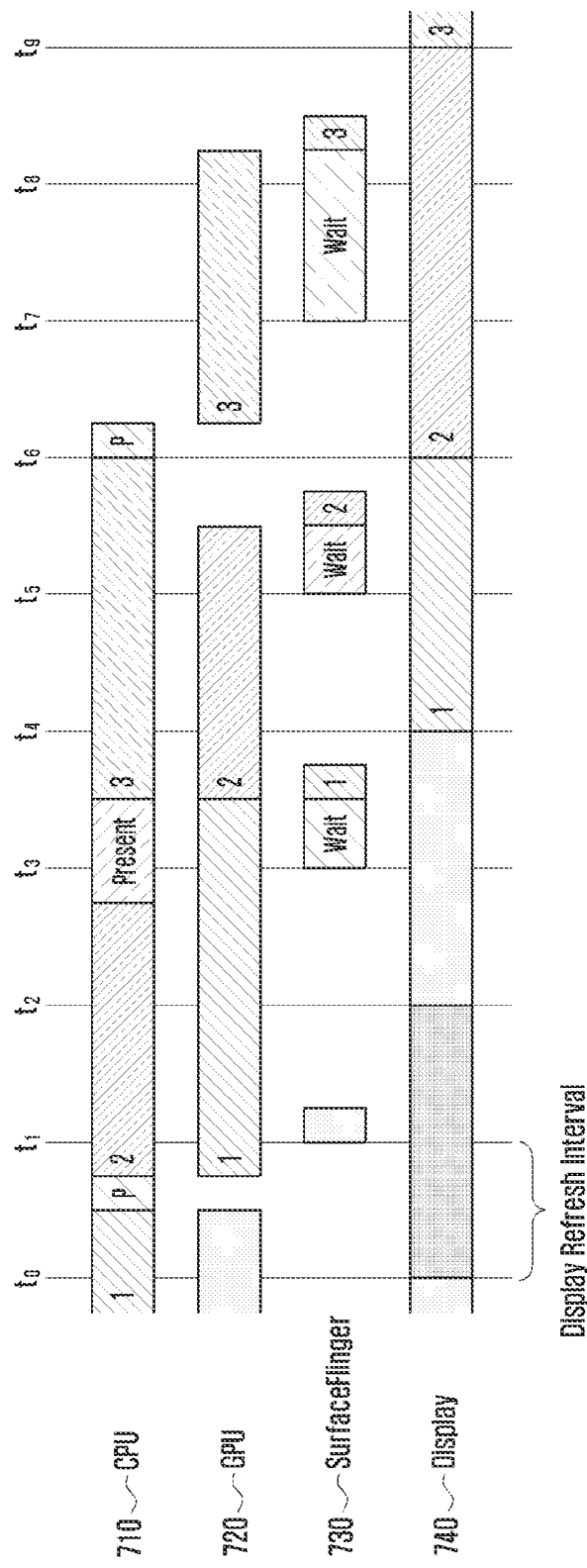
FIG. 7 illustrates a process of processing each frame when a presenting operation is processed by a render thread of a CPU, according to an embodiment.
Figure 8:
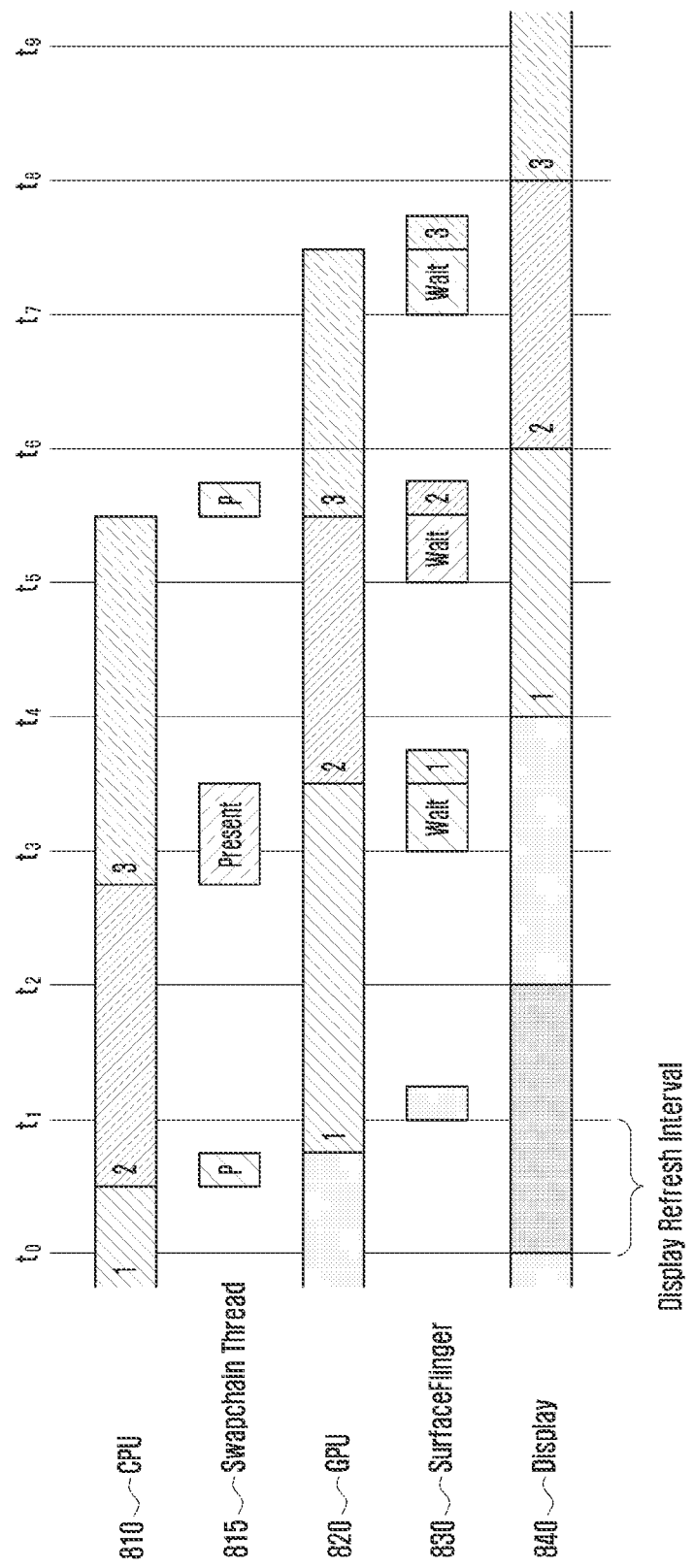
FIG. 8 illustrates a process of processing each frame when a presenting operation is processed by a swap chain thread, according to an embodiment.
Figure 9:
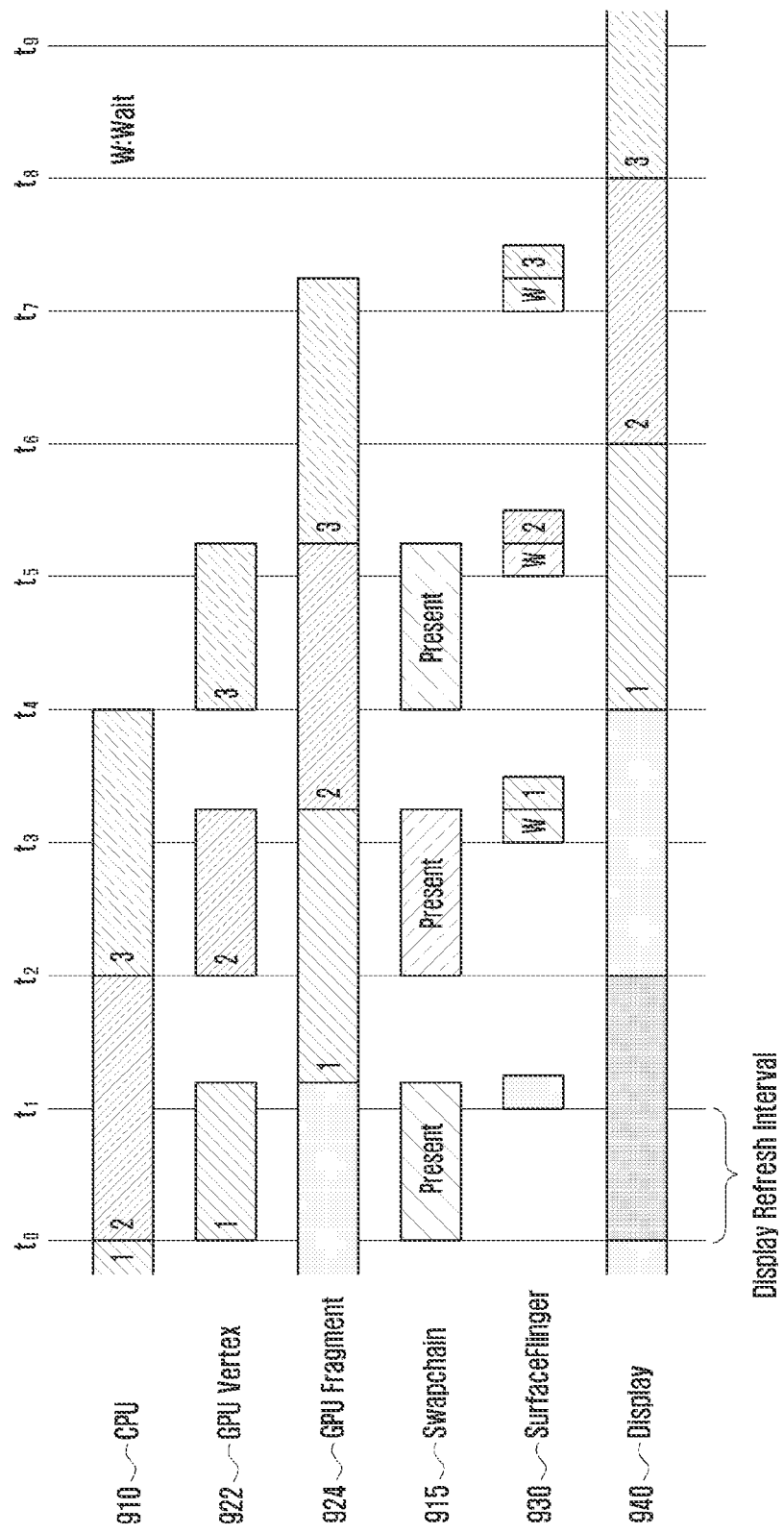
FIG. 9 illustrates a process of processing each frame when graphic processing unit (GPU) vertex processing and fragment processing are processed in parallel, according to an embodiment.

According to an embodiment, with reference to FIGS. 7 to 9, the frame pacer 340 may perform an operation related to presenting the corresponding frame through a swap chain thread. For example, the game engine 310 may transmit the presenting command to the frame pacer 340 instead of directly calling a function e.g., vkQueuepresentKHR) that draws an image. The frame pacer 340 does not perform presenting immediately, but may transmit the presenting command to the swap chain thread 342, and the swap chain thread 342 may perform presenting (e.g., vkQueuepresentKHR) after waiting until rendering by the GPU 330 on the previous frame is completed.

Figure 10:
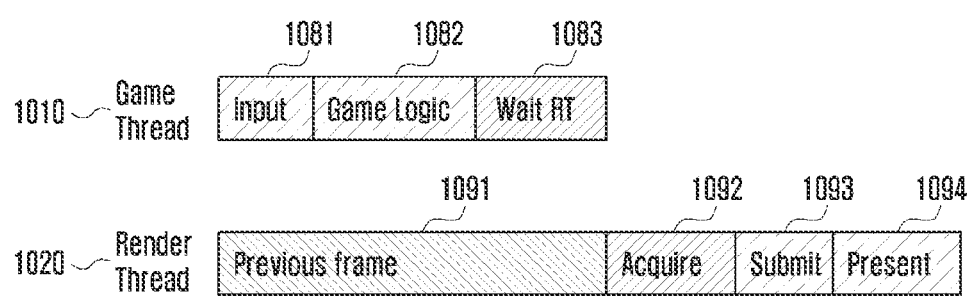
FIG. 10 illustrates an example of a thread executed in a game engine before a sync frame end (SFE) is used, according to an embodiment.
Figure 11:
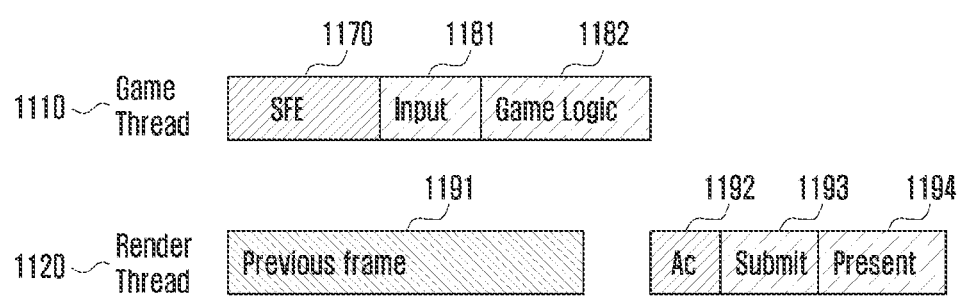
FIG. 11 illustrates an example of a thread executed in a game engine after an SFE is used, according to an embodiment.

According to an embodiment, with reference to FIGS. 10 to 11, the frame pacer 340 may calculate an expected processing time of a current frame based on the processing time of at least one previous frame output through a display, may determine a time margin (or SFE) based on a target frame rate and the calculated expected processing time, and may perform processing of user input and data after a main thread (or game thread) 312 waits in a sleep state during the time margin. For example, the frame pacer 340 may inform the main thread 312 and/or a render thread 314 of frame start and end times of the game engine 310 that match the target fps, thereby providing stable animation and frame time.

FIG. 4 illustrates a process of processing each frame when a timing extension function of a graphics API is not used, according to an embodiment.

In FIGS. 4 to 9, each interval $t_n$ to $t_{n-1}$ is a refresh interval of the display, and when the display operates at 60 fps, the refresh interval may be about 16.6 ins. The display may output an image frame according to a vertical synchronization signal V-sync at a timing and one frame may be displayed for an interval n. Hereinafter, a processing process in a case in which the target fps is 30 will be described.

Referring to FIG. 4, a CPU 410 may start rendering according to a V-sync interval from an application (or a game engine) using a predetermined class (e.g., choreographer). For example, while the CPU 410 is operating, the application may perform rendering on each frame every two V-sync intervals $t_1$, $t_3$, and $t_5$.

When the GPU 420 transmits a presenting command from the CPU 410, the GPU 420 may start rendering on the corresponding frame, and the CPU 410 may wait until the GPU 420 completes rendering of the frame.

At the time of a presenting command of the CPU 410, the surface flinger 430 may compose data stored in a back buffer according to the immediately following V-sync signal and may then output the composed data to a display 440. The surface flinger 430 may wait until a rendering operation of the GPU 420 is completed, and may then output frame data to the display 440 at a V-sync timing after the rendering operation is completed. For example, since the rendering operation of frame 1 of the GPU 420 is completed between $t_4$ and $t_5$, the surface flinger 430 may perform a composition operation from the completion time point after waiting for a time during which the rendering by the GPU 420 is performed, and may output frame data to the display 440 at $t_5$. In addition, the surface flinger 430 may perform a composition operation after the GPU 420 completes a rendering operation on frame 2, and may output frame data to the display 440 at $t_6$.

According to this processing, frame 1 may be displayed for one interval, and frames 2 and 3 may be displayed for two intervals. Accordingly, in this embodiment, a partial error may occur from the intended 30 fps.

FIG. 5 illustrates a process of processing each frame when a timing extension function of a graphics API is used, according to an embodiment.

A surface flinger 530 may adjust a display timing of a rendered frame by applying a timing extension function (e.g., a Vulkan® Google™ display timing extension) of a graphics API (e.g., Vulkan® API). The timing extension function may be a function of delaying the processing timing of the surface flinger 530 so that a presented frame may be output at a time when the presented frame is actually output to the display 540.

Referring to FIG. 5, a GPU 520 may perform rendering according to a presenting command for frame 1 of the CPU 510, and the surface flinger 530 does not perform a composition operation immediately even when the rendering by the GPU 520 is completed, but may perform the composition operation immediately before $t_5$ that is the next V-sync.

As described above, the output interval of each frame may be equally adjusted by using the timing extension function, but in the case of FIG. 5, delay time prediction of the surface flinger 530 may not be accurate. The timing extension function may provide timing information of past frames, but since the immediately previous frame which is currently rendered by the GPU 520 has not yet been output to the display 540, it is difficult to predict an exact frame start time because there is no information on the corresponding frame.

Accordingly, even if the timing extension function is used, frame 1 may be displayed for one interval and frames 2 and 3 may be displayed for two intervals as in FIG. 4. Therefore, even in this embodiment, some errors may occur from the intended 30 fps.

FIG. 6 illustrates a process of processing each frame when a timing extension function of a graphics API is used and presenting timing is adjusted, according to an embodiment.

Even when a frame pacer receives a presenting command from a game engine or a framework, the frame pacer may perform presenting after waiting until a rendering operation of a GPU 620 on the previous frame is completed without performing presenting immediately.

Referring to FIG. 6, a CPU 610 may wait without performing presenting of frame 2 until rendering by the GPU 620 on frame 1 is completed. When rendering by the GPU 620 on frame 1 is completed, the CPU 610 may perform presenting of frame 2, so that the rendering time of the GPU 620 on frame 2 may be delayed. A surface flinger 630 may perform a composition operation after a predetermined delay time without performing the composition operation immediately after rendering by the GPU 620 on each frame by using a timing extension function.

Referring to FIG. 6, as the operation timing of the surface flinger 630 is delayed by the presenting delay and timing extension function of the CPU 610, frame 1 may be displayed on the display 640 for two intervals of $t_6$ to $t_8$. Thereafter, frame 2 and frame 3 may be also displayed for two intervals, so that each frame may be displayed on the display 640 according to a target fps of 30 fps.

In this embodiment, since the CPU 610 waits the presenting operation until the rendering by the GPU 620 on the previous frame is completed, it is possible to calculate the timing at which the immediately previous frame is output to the display 640 at any time. In this way, when presenting is performed by the CPU 610 in consideration of timing information on the immediately previous frame, more accurate and stable fps support may be possible.

According to an embodiment, a presenting wait operation of the CPU 610 may be performed using vkFence of the graphics API.

FIG. 7 illustrates a process of processing each frame when a presenting operation is processed by a render thread of a CPU, according to an embodiment.

According to an embodiment, a presenting operation on each frame may be performed in a render thread of a CPU 710.

Referring to FIG. 7, since the CPU 710 waits for rendering by a GPU 720 on frame 1 after frame 1 is presented, the execution time of frame 2 may be delayed. In this case, when rendering by the CPU 710 on frame 3 is completed late, the overall rendering timing by the GPU 720 may be delayed, so that frame 1 may be displayed on the display 740 for two intervals, while frame 2 may be displayed on the display 740 for three intervals.

Accordingly, some errors may occur from the intended 30 fps.

FIG. 8 illustrates a process of processing each frame when a presenting operation is processed by a swap chain thread, according to an embodiment.

An electronic device may not perform a presenting operation on a frame in a render thread of a CPU 810, but may perform the same in a swap chain thread separated therefrom. For example, a swap chain thread 815 may execute a function (e.g., vkQueuepresentKHR) of transmitting a current frame of a graphics API to a GPU 820 and a surface flinger 830 and a function (e.g., vkacquireNextImageKHR) of retrieving an image of the next frame.

In the embodiment of FIG. 7, as a presenting command is executed by a thread of a game engine or framework, presenting of the next frame may be waited until rendering by the GPU 820 on the previous frame is completed. Such a presenting wait may cause a specific frame to be displayed for a long interval inconsistent with the target fps, and may adversely affect the display timing of the image, particularly in the CPU 810 bound situation.

As the electronic device performs presenting through the swap chain thread, interference synchronization between the thread of the game engine or framework and the GPU 820 may be minimized when presenting is performed, so that the display 840 may output each frame according to the target fps.

Referring to FIG. 8, when rendering by the CPU 810 on frame 1 is completed, presenting of frame 1 may be performed in the swap chain thread. The GPU 820 may perform rendering on frame 1 according to a presenting command, and the surface flinger 830 may perform composition when rendering by the GPU 820 is completed, so that frame 1 may be displayed on the display 840 at $t_4$ which is the next V-sync timing.

The render thread of the framework may perform a drawing operation on the next frame while performing the presenting operation in the swap chain thread, so that processing delay of the next frame may not occur. Referring to FIG. 8, after the presenting command in frames 2 and 3, the delay time can be reduced when rendering by the CPU 810 is performed, so that frame 3 may be displayed at $t_8$ and frames 1 to 3 may be all displayed for two intervals. In this way, as presenting is performed in the swap chain thread, it is possible to provide a more stable fps even in the CPU 810 bound situation.

FIG. 9 illustrates a process of processing each frame when GPU vertex processing and fragment processing are processed in parallel, according to an embodiment.

According to an embodiment, an electronic device may concurrently execute processing on a GPU vertex 922 and processing on a GPU fragment 924 in a GPU pipeline.

Referring to FIG. 9, when a CPU 910 completes drawing of each frame, processing on the GPU vertex 922 may be performed, and then processing on the GPU fragment 924 may be performed. In this embodiment, since the GPU vertex 922 and the GPU fragment 924 are processed in parallel, the GPU vertex 922 of frame 2 may be performed even before the GPU fragment 924 of frame 1 is completed.

The electronic device may perform presenting of the frame through the swap chain thread. Accordingly, even when the presenting time of the frame drawn by the CPU 910 is long, each frame may be displayed on the display 940 for the same two intervals.

FIG. 10 illustrates an example of a thread executed in a game engine before an SEE is used, according to an embodiment.

A game thread 1010 may process a user input and may execute gam logic based on the user input. The game thread 1010 may output data related to an image update according to the execution of the game logic to a render thread 1020. The render thread 1020 may render image data in units of frames according to data received from the game thread 1010. The rendering operation of the render thread 1020 may include acquiring, submitting, and presenting operations. When rendering by the render thread 1010 on one frame is completed, the game thread 1010 may provide data for the next frame to the render thread 1020.

Referring to FIG. 10, the execution of a user input 1081 and a game logic 1082 may be completed in the game thread 1010 while the image frame is processed in the render thread 1020. In this case, the game thread 1010 may wait 1083 until the render thread 1020 completes the processing on the corresponding frame. In this case, since an operation on a previous frame 1091 of the GPU may not be completed at the time when acquisition 1092 of the render thread 1020 is executed, the execution of the acquisition 1092 may be delayed. As described above, depending on the delay of the acquisition 1092, submitting 1093 and presenting 1094 are also delayed, so that overall image data processing time can be increased.

FIG. 11 illustrates an example of a thread executed in a game engine after an SEE is used, according to an embodiment.

A game engine or a framework may configure a time margin for correcting a smooth operation of a GPU during an actually executed frame processing time in consideration of a target fps. Here, the time margin may be referred to as SFE.

A game thread 1110 may perform a sleep during an SFE 1170 even when a user input is detected on a game application, and may process a user input and execute a game logic after the SFE 1170 has elapsed.

The SFE 1170 (or time margin) may be calculated as a difference between an allowable time of the target fps and a predicted execution time of a current frame. Here, the allowable time of the target fps may be determined as an average value of the time from the presenting of each frame to the output to the display in the target fps. The predicted execution time of the current frame may be calculated as an average of differences in time during which the game thread 1110 presents the frame in previous frames.

Referring to FIG. 11, even when a user input is detected, the game thread 1110 may wait for the SFE 1170 interval without immediately processing the user input. The game thread 1110 may then process a user input 1181 and may execute a game logic 1182 after the SFE 1170 has elapsed, so that time for the render thread 1120 to process a previous frame 1191 may be additionally secured, and the execution time of acquisition 1192 may be shortened.

When the SFE is used as in this embodiment, an error may occur when calculating a sleep time of the game thread because the sleep time is calculated based on a predicted or expected time for a current frame processing time. When an error occurs in the SEE time during actual frame processing, the error may be corrected by increasing or decreasing the delay time of the surface flinger by the corresponding error. The electronic device may accumulate and store the error correction time in the SFE time, and may determine the SFE time to be applied to the next frame by using the accumulated value. In addition, by providing the corrected SFE time to the game engine and framework, it is possible to provide uniform rendering timing information for each frame, and the rendering timing information may be used to render an accurate animation position for each frame in the game engine or application.

In order to further reduce the execution time of the acquisition in the render thread, the number of swap chain images may be increased. In general, a mobile platform (e.g., an Android™ platform) may use three swap chain images in the render thread, and when the number of the swap chain images is increased to 4, the execution time of the acquisition may be reduced in certain situations. For example, when rendering an image, processing of the GPU may take a long time due to the load on the GPI. In this case, one of the three swap chain images may be output to the display, another thereof may wait for composition because processing of the GPU has not been completed in the surface flinger, and the remaining one may be in a process of performing a task in the processing of the GPU. In this case, even if acquisition is executed in the render thread, since there is no remaining image, the execution time of acquisition may be long. When four swap chain images are used, the wait time may be reduced. That is, the frame processing time from the input of the game thread to the presenting of the render thread can be shortened, and even if processing on a specific frame takes a long time, time to correct this may be secured, so that smooth frame pacing can be performed.

Figure 12:
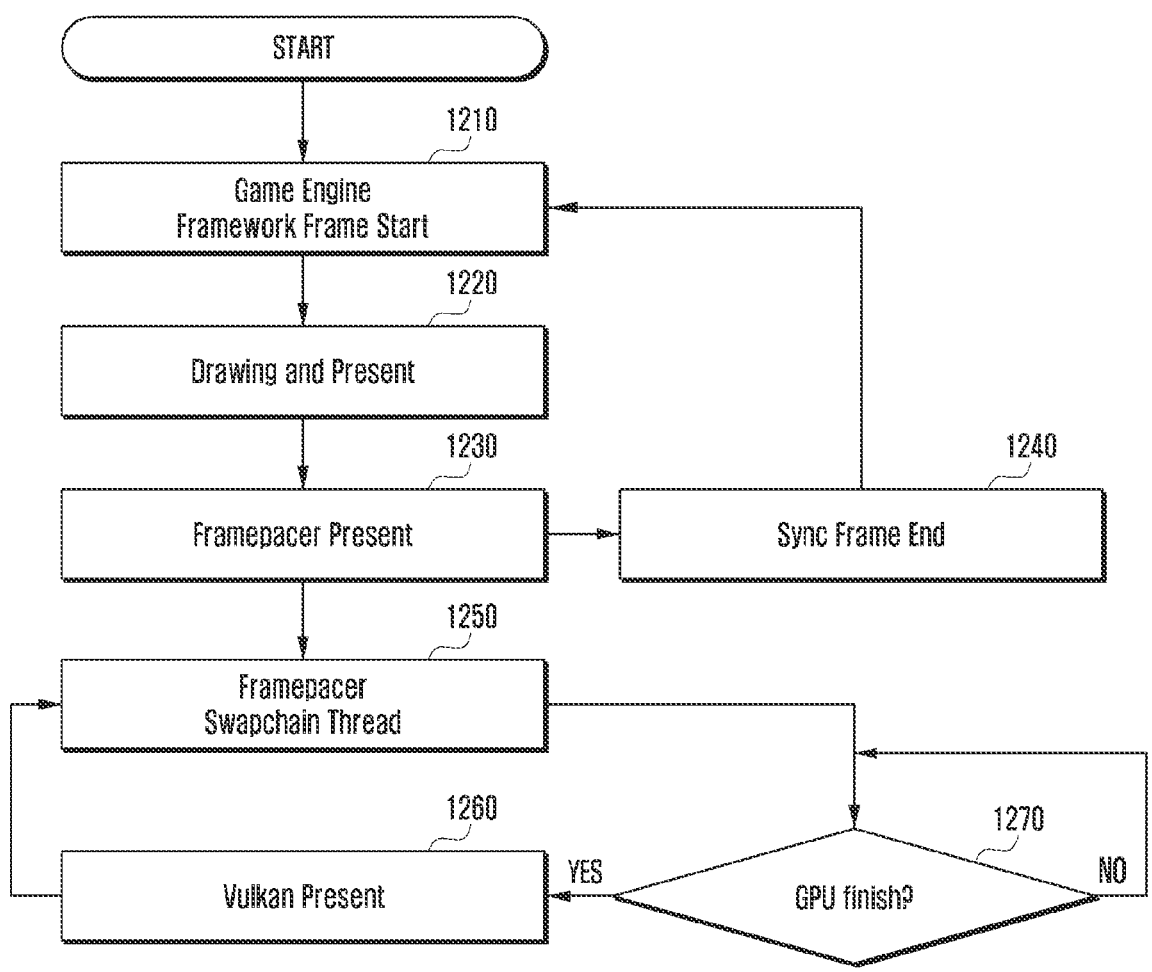
FIG. 12 is a flowchart illustrating an image rendering method of an electronic device, according to an embodiment.

FIG. 12 is a flowchart illustrating an image rendering method of an electronic device, according to an embodiment.

A game engine (or framework) starts an operation of generating a frame constituting an execution screen of a game application in step 1210, and draws and presents the frame in step 1220. The game engine may not present the frame to a graphics API and may present the frame to a frame pacer.

In step 1230, the frame pacer presents the frame.

In step 1240, a main thread waits in a sleep state for an SFE (or time margin), and then processes a user input and data when the SIT time has elapsed. Here, the SFE (or time margin) may be calculated as a difference between an allowable time of a target fps and a predicted or expected execution time of a current frame.

In step 1250, the frame pacer performs presenting through a swap chain thread. The swap chain thread identifies identify whether GPU rendering on a previous frame is completed in step 1270, and performs presenting (e.g., vkQueuepresentKHR) of the graphics API in step 1260 when GPU rendering is completed. In this way, by performing acquisition and presenting in the swap chain thread, the CPU processing time of the game engine can be guaranteed. In addition, since presenting is performed by identifying when rendering of the GPU is finished, it is possible to provide a more stable frame time in a GPU-bound situation.

An electronic device according to various embodiments may include a display, a memory, and a processor configured to be operatively connected to the display and the memory. The processor is configured to generate a main thread related to a user input and data processing on an application in response to execution of the application and a render thread related to rendering image data in units of frames based on data processed in the main thread, configure a target frame rate for displaying an execution screen of the application on the display, calculate an expected processing time of a current frame based on a processing time of at least one previous frame output through the display, determine a time margin based on the target frame rate and the calculated expected processing time, and perform the user input and data processing after the main thread waits in a sleep state for the time margin.

The processor may be configured to calculate the expected processing time based on a presenting time of the at least one previous frame.

The processor may be configured to allow the main thread to process a user input obtained before a time interval corresponding to the current frame after the sleep state is completed.

The processor may include a CPU that executes the main thread and the render thread, and a GPU that renders a frame according to a presenting command of the CPU.

When receiving presenting information on a specific frame from a game engine or a framework, the CPU may be configured to transmit a presenting command corresponding to the received presenting information to the GPU after a rendering operation of the GPU on a previous frame of the specific frame is completed.

The frame rendered according to the presenting command may be transmitted to a surface flinger, and the surface flinger may display the frame on the display according to a vertical synchronization signal.

The surface finger may be configured to process the rendered frame after a predetermined delay time after the rendering operation of the GPU is completed.

The processor may further execute a swap chain thread and may perform a presenting command of the generated frame through the swap chain thread.

The swap chain thread may be configured to perform a function of transmitting the current frame to the GPU and the surface flinger and a function of obtaining a next frame.

The application may be a game application.

An image rendering method of an electronic device according to various embodiments may include generating a main thread related to a user input and data processing on an application in response to execution of the application and a render thread related to rendering image data in units of frames based on data processed in the main thread, configuring a target frame rate for displaying an execution screen of the application on a display, calculating an expected processing time of a current frame based on a processing time of at least one previous frame output through the display, determining a time margin based on the target frame rate and the calculated expected processing time, and performing the user input and data processing after the main thread waits in a sleep state for the time margin.

Calculating the expected processing time may include calculating the expected processing time based on a presenting time of the at least one previous frame.

The processor may be configured to allow the main thread to process a user input obtained before a time interval corresponding to the current frame after the sleep state is completed.

The electronic device may include a CPU that executes the main thread and the render thread, and a GPU that renders a frame according to a presenting command of the CPU.

When receiving presenting information on a specific frame from a game engine or a framework, the CPU may be configured to transmit a presenting command corresponding to the received presenting information to the GPU after a rendering operation of the GPU on a previous frame of the specific frame is completed.

The frame rendered according to the presenting command may be transmitted to a surface flinger, and the surface flinger may display the frame on the display according to a vertical synchronization signal.

The image rendering method may further include processing, by the surface flinger, the rendered frame after a predetermined delay time after the rendering of the GPU is completed.

The image rendering method may further include executing a swap chain thread, and performing a presenting command of the generated frame through the swap chain thread.

The swap chain thread may be configured to perform a function of transmitting the current frame to the GPU and the surface flinger and a function of obtaining a next frame.

The application may be a game application.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:
1. An electronic device comprising:
a display;

a memory; and a processor configured to be operatively connected to the display and the memory, wherein the processor is configured to:

generate a main thread related to a user input and data processing on an application in response to execution of the application and a render thread related to rendering image data in units of frames based on data processed by the main thread, configure a target frame rate for displaying an execution screen of the application on the display, calculate an expected processing time of the render thread for processing a current frame based on a processing time of at least one previous frame output through the display, determine a time margin based on the target frame rate and the calculated expected processing time, and process the user input and perform data processing by the main thread after the main thread waits in a sleep state for the time margin, wherein the user input is received while the render thread is processing the current frame.

2. The electronic device of claim 1, wherein the processor is further configured to calculate the expected processing time based on a presenting time of the at least one previous frame.

3. The electronic device of claim 1, wherein the processor is further configured to allow the main thread to process a user input obtained before a time interval corresponding to the current frame after the sleep state is completed.

4. The electronic device of claim 1, wherein the processor comprises a central processing unit (CPU) that executes the main thread and the render thread, and a graphic processing unit (GPU) that renders a frame according to a presenting command of the CPU.

5. The electronic device of claim 4, wherein, when receiving presenting information on a specific frame from a game engine or a framework, the CPU is configured to transmit a presenting command corresponding to the received presenting information to the GPU after a rendering operation of the GPU on a previous frame of the specific frame is completed.

6. The electronic device of claim 5, wherein the frame rendered according to the presenting command is transmitted to a surface flinger, and the surface flinger displays the frame on the display according to a vertical synchronization signal.

7. The electronic device of claim 6, wherein the surface flinger is configured to process the rendered frame after a predetermined delay time after the rendering operation of the GPU is completed.

8. The electronic device of claim 1, wherein the processor is further configured to execute a swap chain thread and perform a presenting command of the generated frame through the swap chain thread.

9. The electronic device of claim 8, wherein the swap chain thread is configured to perform a function of transmitting the current frame to the GPU and the surface flinger and a function of obtaining a next frame.

10. The electronic device of claim 1, wherein the application is a game application.

11. An image rendering method of an electronic device comprising:

generating a main thread related to a user input and data processing on an application in response to execution of the application and a render thread related to rendering image data in units of frames based on data processed by the main thread;

configuring a target frame rate for displaying an execution screen of the application on a display;

calculating an expected processing time of the render thread for processing a current frame based on a processing time of at least one previous frame output through the display;

determining a time margin based on the target frame rate and the calculated expected processing time; and process the user input and perform data processing by the main thread after the main thread waits in a sleep state for the time margin, wherein the user input is received while the render thread is processing the current frame.

12. The image rendering method of claim 11, wherein calculating the expected processing time comprises calculating the expected processing time based on a presenting time of the at least one previous frame.

13. The image rendering method of claim 11, further comprising:

allowing the main thread to process a user input obtained before a time interval corresponding to the current frame after the sleep state is completed.

14. The image rendering method of claim 11, wherein the electronic device comprises a central processing unit (CPU) that executes the main thread and the render thread, and a graphic processing unit (GPU) that renders a frame according to a presenting command of the CPU.

15. The image rendering method of claim 14, wherein, when receiving presenting information on a specific frame from a game engine or a framework, the CPU is configured to transmit a presenting command corresponding to the received presenting information to the GPU after a rendering operation of the GPU on a previous frame of the specific frame is completed.

16. The image rendering method of claim 15, wherein the frame rendered according to the presenting command is transmitted to a surface flinger, and the surface flinger displays the frame on the display according to a vertical synchronization signal.

17. The image rendering method of claim 16, further comprising:

processing, by the surface flinger, the rendered frame after a predetermined delay time after the rendering of the GPU is completed.

18. The image rendering method of claim 11, further comprising:

executing a swap chain thread; and performing a presenting command of the generated frame through the swap chain thread.

19. The image rendering method of claim 18, wherein the swap chain thread is configured to perform a function of transmitting the current frame to the GPU and the surface flinger and a function of obtaining a next frame.

20. The image rendering method of claim 11, wherein the application is a game application.

* * * * *